United States Patent Office

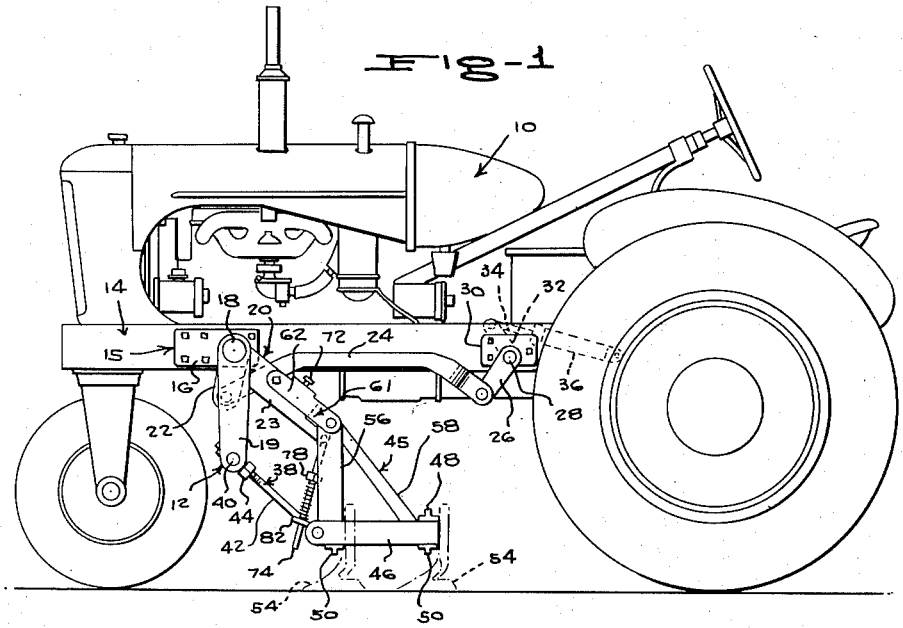

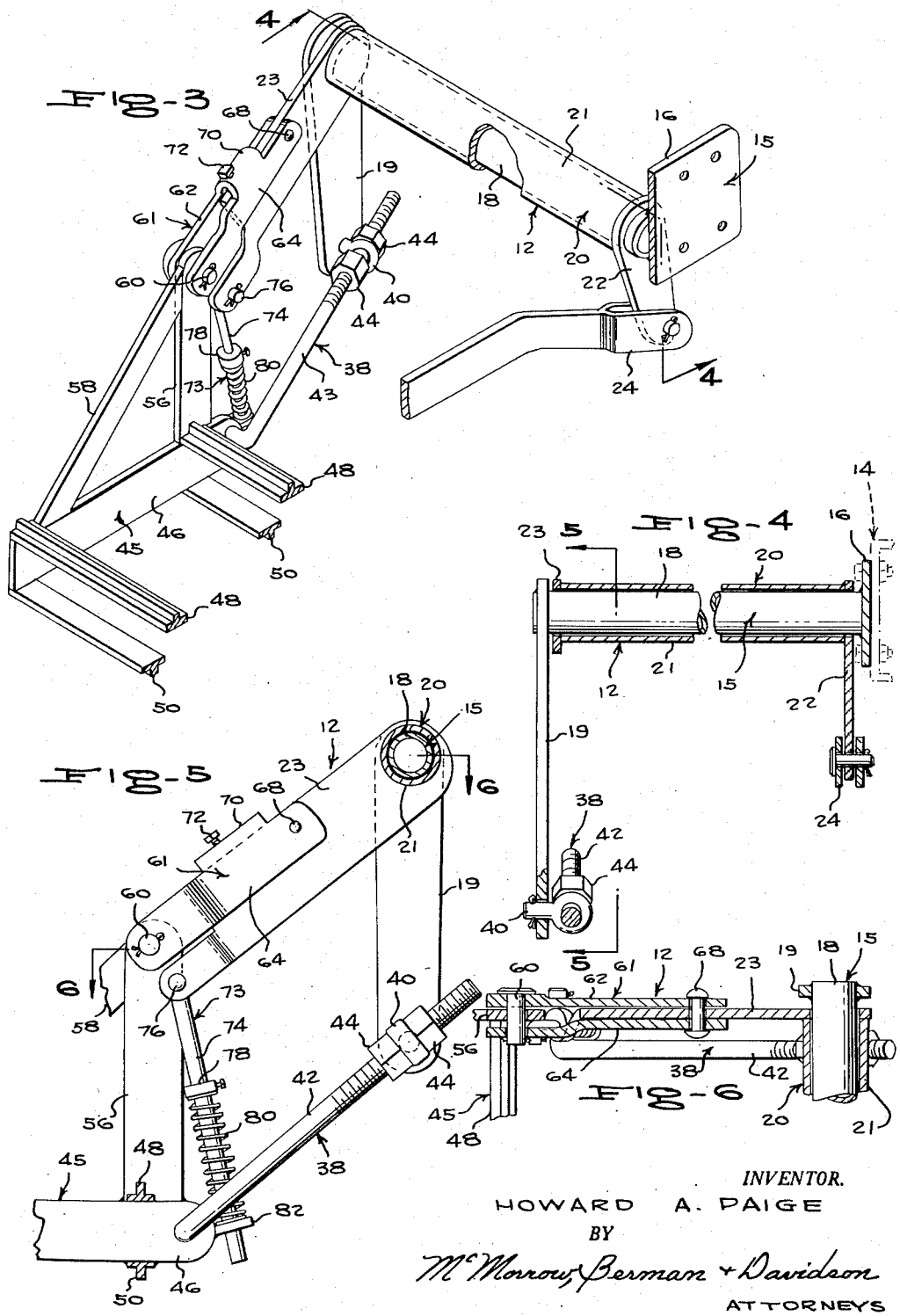

2,793,577
Patented May 28, 1957

2,793,577

TRACTOR-ATTACHED TOOL BAR-SUPPORT MECHANISM

Howard A. Paige, Watsonville, Calif.

Application July 6, 1956, Serial No. 596,249

3 Claims. (Cl. 97—47.34)

This invention relates to a tool bar support for a tractor, adapted for supporting a tool bar carrying any of various ground working tools, such as cultivators, etc.

Desirably, a tractor tool bar support assembly should be of maximum simplicity, while still being adapted to permit the tool bar and associated, supported ground-working tools to float over hard obstructions encountered, with the tool bar being, at the same time, firmly but yieldably biased in the direction of the ground to hold the tools in proper, operative position. Further, the tool bar support assembly should be so designed as to facilitate the elevation of the tool bar whenever desired, wholly out of contact with the ground.

Tool bar support assemblies heretofore devised have been designed to incorporate therein one or more of the abovementioned features, but to produce a tool bar that will have all the mentioned desirable characteristics, it has generally been necessary to provide a relatively complicated structure. It has generally been proposed, and is presently conventional construction, to connect to the hydraulic lift arm of the tractor a depending lift rod, connected at its lower end to a tool bar connected by parallel links to opposite ends of a plate rocking on or with a support shaft, with a spring being circumposed about the lift rod for exerting a continuous downward pressure upon the tool bar.

In accordance with the present invention, there is provided a stationary support means in the form of a laterally extending support bar rigid with and projecting outwardly from the frame of the tractor, said support bar being rigid at its outer end with a depending arm. In accordance with the invention there is rotatably mounted upon the support bar a hollow shaft or tubular member, and rigid with one end of the tubular member is a depending radius arm, having a pivotal connection to a linkage extending to the hydraulic lift arm of the tractor. Rigid with the other end of the tubular member is a rearwardly, downwardly inclined tool bar support arm, and vertically swingable upon the tool bar support arm is a support link, pivotally connected to the tool bar end frame. Also connected to the tool bar support arm is a depending rod, about which is circumposed a compression, coil spring.

The arrangement is such that when the tubular member is rotated responsive to operation of the hydraulic lift arm in a direction to elevate the tool bar support arm, said tool bar support arm will swing upwardly, and will carry with it the tool bar support link, thus elevating the tool bar. The arrangement in these circumstances is, for all practical purposes, similar to one in which the tool bar frame is pivotally connected directly to the tool bar support arm. However, when the tool bar is in operative position with the support arm lowered, it is adapted to float upwardly, against the restraint of the coil spring, over obstacles, with the link now being free to swing upwardly relative to the support arm.

By reason of the arrangement, the tool bar lift means, the tool bar supporting members, and the means permitting the tool bar to float over obstacles are all incorporated in a simple, unitary assembly, as distinguished from prior art structures which have not been so designed.

It is one important object of the invention to provide a tool bar support for tractors which will, by reason of its simplified construction and the particular formation and relative arrangement of the parts, provide greater visibility and better control of all ground-working tools used.

Another important object is to provide an assembly as stated that will be considerably simpler in design than assemblies previously devised for the purpose of supporting ground-working tools.

Yet another object is to achieve, while simplifying the design of the assembly and while, further, incorporating in a single unit structural and functional characteristics which have heretofore only been found in wholly separate units, a rigidly of construction, an ability of the device to operate with minimum need for repair and maintenance, and an adaptability of the device for mounting on wholly conventional tractors of various makes presently in use, without requiring modification or redesign of the tractors in any way.

Other objects will appear from the following description, the claims appended thereto, and from the annexed drawing in which like reference characters designate like parts throughout the several views and wherein:

Figure 1 is a side elevational view of a tractor equipped with a tool bar support mechanism formed according to the present invention;

Figure 2 is a top plan view of the tractor and said assembly;

Figure 3 is an enlarged, fragmentary perspective view showing one end of the assembly;

Figure 4 is a sectional view on line 4—4 of Figure 3, on the same scale as Figure 3;

Figure 5 is a sectional view on line 5—5 of Figure 4, on the same scale as Figure 4; and Figure 6 is a horizontal section on line 6—6 of Figure 5, on the same scale as Figure 5.

Referring to the drawings in detail, designated generally by the reference numeral 10 is a conventional tractor of modern design. The invention 12 can be mounted on any of various well known makes of tractors, as will presently appear.

Designated generally at 14 is the frame of the tractor, and in accordance with the invention there is fixedly attached to opposite sides of the frame, in positions projecting laterally outwardly from the frame, identically but oppositely formed main support assemblies or structures, each generally designated by the reference numeral 15 (see Figures 2 and 4).

Each of the stationary main support structures includes, at its inner end, a rectangular mounting plate 16, apertured to receive bolts for fixedly securing the same to the respective side rails of the tractor frame 14. Welded at its inner end to and projecting horizontally, outwardly from plate 16 is an elongated spindle or support bar 18 of circular cross section. Welded at its upper end to and depending substantially vertically from the outer or free end of spindle 18 is a wide, flat hanger 19.

This completes the construction of the main, stationary support structure 15. In summary, it may be properly stated that the invention includes, in this regard, at each side of the tractor, an outwardly projecting, wholly immovable and rigidly constituted support means of inverted L-shape, from which all remaining components of the invention are supported.

Rotatable about the axis defined by the stationary spindle 18 is a tool bar supporting and lifting assembly generally designated by the reference numeral 20. This also is rigidly constituted.

It constitutes an elongated, hollow shaft 21 receiving and extending substantially the full length of the stationary spindle 18 and freely rotating on the spindle; a relatively short radius or crank arm 22 depending from and rigidly secured to the inner end of the hollow shaft 21 (Figures 3 and 4); and a longer tool bar support arm 23 rigid at its forward end with and extending rearwardly from the outer end of the hollow shaft 21.

Assembly 20 as previously noted is bodily rotatable about spindle 18, and since it discharges not only the function of supporting the tool bar, but also the function of lifting the tool bar, the arm 22 is pivotally connected at its lower end to the bifurcated front end of an elongated lifting link 24 (Figures 1 and 2) extending along each side of tractor frame 14 and terminating at its rear end in a bifurcation pivotally connected to the conventional lift arm 26 of the tractor. The tractor, as is usual, is equipped with lift arms at opposite sides thereof, it being understood that the inventive device is duplicated at both sides of the tractor as shown in Figure 2, with the respective lift arms 26 being connected to the opposite ends of a rock shaft 28, said ends of the rock shaft projecting through plates 30 provided at opposite sides of the tractor frame. As is usual, the rock shaft 28 is provided intermediate its ends with a crank arm 32, to the outer end of which is pivotally connected a piston 34 extending into the hydraulic cylinder 36 pivotally mounted upon the tractor.

A lower connecting link assembly generally designated 38, which as distinguished from support structure 15 and supporting and lifting assembly 20 is per se conventional, includes (Figures 3 and 5) an eye 40 rotatably mounted upon the lower end of hanger 19 and receiving the forward end of a link member 42, said forward end of the link member being threaded to receive adjusting and lock nuts 44, bearing against opposite sides of eye 40. Link member 42 can be adjusted axially within the eye, to a selected position, after which the nuts 44 are turned home against the eye to preserve the adjustment, the link member thereafter rotating about an axis extending transversely thereof and defined by the shank of the eye 40, said axis being parallel to the axis of rotational movement of the combined supporting and linking assembly 20.

A tool bar assembly has been generally designated at 45, and is per se conventional. It includes horizontal end bars 46, to the top edges of which are fixedly attached upper tool support rails 48, of T-shaped cross section. To the bottom edge of the end bars 46 there are attached lower tool support rails 50. These, as shown in Figure 2, extend under and perpendicularly to the length of the tractor, projecting laterally substantial distances beyond the opposite sides of the tractor. Rigidifying the construction is a series of brace bars 52 extending in a fore-and-aft direction at locations spaced along the length of the tool bar assembly 45. Carried by and depending from the respective rails 48, 50 at selected locations transversely of the tractor, are ground-working tools 54 of any suitable, conventional design (see Figure 1). At each end, the tool bar assembly 45 includes triangular end frames disposed in vertical planes, the end bars 46 constituting the lower or horizontal legs of said frames. Said frames also include vertical legs 56 projecting upwardly from and made rigid with the forward portions of the end bars 46, and inclined brace bars 58 connected between the end bars 46 and the vertical legs 56.

The link member 42, at its rear end, has a lateral extension pivoting in an opening formed in the front end of the end bar 46. At the upper end of leg 56, there is formed an opening receiving a connecting pin 60, whereby the tool bar assembly is pivotally connected to a support link assembly generally designated at 61 and carried by the combined tool bar supporting and lifting assembly 20.

The support link assembly 61 comprises a pair of outer and inner link elements 62, 64 respectively embracing between them the top portion of the support arm 23 of the assembly 20. The rear end portion of the inner link element 64 is offset laterally, inwardly of the structure as best shown in Figure 6, to provide clearance between the link elements at the rear ends thereof for parts received therebetween.

At their forward ends, the link elements 62, 64 (see Figures 3 and 6) have transversely aligned openings, registering with an opening formed in the intermediate portion of the support arm 23, and extending through the several openings is a connecting pin 68, whereby the support link assembly 61 is pivoted upon the support arm 23 for vertical swinging movement, about an axis paralleling the axis for rotation of the supporting and lifting assembly 20.

Integrally connected between the intermediate portions of the link elements 62, 64 is a web or saddle 70, straddling the support arm 23. Threaded in the saddle 70 is a set screw 72, bearing against the top edge of the support arm 23.

It will be seen that the saddle 70 and its associated set screw 72 provides abutment means engaging the top edge of the support arm 23 to limit downward swinging movement of the support link assembly about the axis defined by the pin 68, upon the support arm 23. By suitable adjustable positioning of the set screw, the extent to which the support link assembly 61 can be swung downwardly about its pivot 68 is regulated at the option of the user. Means is associated with the support link assembly 61 so designed as to exert a continuous, yielding pressure tending to swing the support link 61 downwardly together with the tool bar assembly 45 carried thereby, for the purpose of yieldably maintaining the tool bar assembly in its normal, operative position in which the ground working tools 54 extend into the ground. This means has been generally designated at 73, and includes a guide rod 74 having a lateral extension 76 at its upper end pivotally engaging in an opening formed in the rear end of the support arm 23. A set collar 78 is secured to the intermediate portion of rod 74 at a selected location along the length of said rod, and bearing at its upper end against the set collar is a compression, coil spring 80, receiving rod 74 and bearing at its lower end against a forwardly projecting ear 82 rigid with the front end of the end bar 46 of the tool bar assembly 45.

It will thus be seen that assuming that the tool bar assembly were to encounter an unyielding obstruction such as an outcropping of rock, it will float over said obstruction. When the tool bar assembly floats over the obstruction, it is moved upwardly by the obstruction, compressing spring 80 and causing support link assembly 61 to swing upwardly about its pivot 68, with the support arm 23 remaining stationary. The lower link assembly 38 would of course pivot upwardly at its rear end, about the axis of the eye 40. As soon as the obstruction has been passed, spring 80, expanding, exerts downward pressure upon ear 82, causing the tool bar assembly 45 to move downwardly together with the support link assembly 61, with the downward movement of the components being limited by engagement of the upper edge of the support bar 23 by the set screw 72.

In use of the apparatus, it will be seen that if it were desired to completely elevate the tool bar assembly together with its associated ground working tools 54 out of contact with the ground, as for example when the tractor is moving to or from a field, one operates the hydraulic lift mechanism of the tractor, in a direction to rotate the assembly 20 clockwise in Figures 3 and 5, about the stationary support structure 15. This causes the arm 23 to swing upwardly in Figures 3 and 5, and the support link assembly 61 will swing upwardly with arm 23, under these particular circumstances, as though it were rigidly connected to the arm 23, thus elevating the tool bar assembly, the lower link assembly 38, and the tool bar hold-down means 73. The elevation of the tool bar assembly under these circumstances does not, of course, compress spring 80 in any way beyond its normal compression.

Subsequently, when the implement is to be used, the hydraulic lift mechanism is operated to rotate the assembly 21 in a reverse direction, to dispose the ground-working tools 54 in operative position for working of the ground. Thereafter, as the tractor operates, the spring 80 will resiliently, yieldably maintain the tool bar assembly in its operative position shown in Figure 1, but at the same time, the tool bar assembly is floatingly mounted upon the now stationary assembly 20, so as to float over obstacles and then return to operative position as the spring 80 expands following increased compression thereof.

It may be noted that the construction feature permits proper, initial adjustments of the positions of the various components. By axial adjustment of the link member 42, the tool bar assembly 45 is caused to be tiltably adjusted about its axis 60, and further, independently of or in combination with this particular adjustment, the set screw 72 can be adjusted to controllably limit the extent to which the tool bar will swing downwardly relative to arm 23 about axis 68. Further, the tension used to maintain the continuous, yielding force against the tool bar assembly 85 can be adjusted by selective positioning of the set collar 78 along rod 74.

So far as is known, it has not previously been suggested that a tool bar assembly 45 be supported in the manner illustrated, utilizing a stationary spindle-like structure having a depending hanger 19, and utilizing further a combined tool bar supporting and lifting assembly 20 rotatable about the spindle 18 and including at one end an arm swung by the hydraulic lift mechanism of the tractor, and including at its other end a tool bar support arm, with the tool bar assembly pivoted upon the support arm in such a manner, further, as to float upwardly relative to the support arm over obstacles encountered during operation of the tractor. The conventional practice, heretofore, as previously noted, has been to connect a lift rod to the lift arm of the tractor, and it has been heretofore required that a separate arm and shaft be utilized to provide for the up-and-down movement of said rod.

The construction of the invention, as distinguished from this conventional arrangement, results in greater rigidity and better vision of the work being performed by the implement, at the same time producing a simpler construction without loss of efficiency of the device or of full adaptability thereof to ride over, without adverse effect on any of the component parts, obstructions encountered during use.

It is believed apparent that the invention is not necessarily confined to the specific use or uses thereof described above since it may be utilized for any purposes to which it may be suited. Nor is the invention to be necessarily limited to the specific construction illustrated and described, since such construction is only intended to be illustrative of the principles in construction that may be permitted within the scope of the appended claims.

What is claimed is:

1. In a tractor-attached supporting and lifting device for an implement to be carried by a tractor having a lift mechanism, a support structure rigid with the tractor and including a generally horizontal spindle and a hanger rigid with and depending from the spindle; a combined supporting and lifting assembly including a hollow shaft receiving and rotatably mounted upon the spindle, a radial arm rigid with the shaft and adapted to be connected with said mechanism for rotating the shaft, and a support arm also rigid with and extending radially from the shaft; a support link assembly pivotally connected at one end to the support arm intermediate opposite ends of the support arm, for up-and-down swinging movement upon and relative to the support arm, said support link assembly engaging against the support arm when swung downwardly thereupon, the support link assembly being adapted at its other end for pivotal connection to an implement, thus to provide for floating of the implement over obstacles encountered thereby with the support link assembly swinging upon said support arm and the supporting and lifting assembly remaining stationary in a selected position of rotational adjustment thereof about the support structure, and to provide, further, for bodily raising and lowering the implement and the support link assembly with the support arm responsive to rotation in a shaft upon the spindle; a lower link assembly pivotally connected at one end of the hanger and adapted at its other end for pivotal connection to the implement at a location spaced from the pivotal connection of the implement to the support link assembly; and resilient, yielding means connected to the support arm in position to exert a continuous, yielding pressure in a downward direction against the implement tending to hold the support link assembly in engagement with the support arm.

2. In a tractor-attached supporting and lifting device for an implement to be carried by a tractor having a lift mechanism, a supporting structure rigid with the tractor and including a generally horizontal spindle and a hanger rigid with and depending from the spindle; a combined supporting and lifting mechanism including a hollow shaft receiving and rotatably mounted on the spindle, a radial arm rigid with the shaft and adapted to be connected with said mechanism for rotating the shaft, and a support arm also rigid with and extending radially from the shaft; a support link assembly pivotally connected to one end to the support arm for up-and-down swinging movement upon the support arm, and engaging against the support arm when swung downwardly thereupon, said support link assembly being adapted for pivotal connection to an implement at the other end of the support link assembly, thus to provide for floating of the implement over obstacles encountered thereby with the support link assembly swinging upwardly on the support arm and the supporting and lifting assembly remaining stationary in a selected position of rotatable adjustment thereof about the support structure, and to provide further for bodily raising and lowering the implement and the support link assembly with the support arm responsive to rotation of the shaft upon the spindle; a lower link assembly having a pivotal connection to the implement at a location spaced from the pivotal connection of the implement to the support link assembly, said lower link assembly being axially adjustable within its pivotal connection to the hanger to provide for tiltable adjustment of the implement about the axis of the pivotal connection of the implement to the support link assembly; and resilient, yielding means connected to the support arm in position to exert a continuous, yielding pressure in a downward direction against the implement tending to hold the support link assembly in engagement with the support arm.

3. In a tractor-attached supporting and lifting device for an implement to be carried by a tractor having a lift mechanism, a support structure rigid with the tractor and including a generally horizontal spindle and a hanger rigid with and depending from the spindle; a combined supporting and lifting mechanism including a hollow shaft receiving and rotatably mounted on the spindle, a radial arm rigid with the shaft and adapted to be connected with said mechanism for rotating the shaft, and a support arm also rigid with and extending radially from the shaft; a support link assembly pivotally connected to one end to the support arm for up-and-down swinging movement upon the support arm, and engaging against the support arm when swung downwardly thereupon, said support link assembly being adapted for pivotal connection to an implement at the other end of the support link assembly, thus to provide for floating of the implement over obstacles encountered thereby with the support link assembly swinging upwardly on the support arm and the supporting and lifting assembly remaining stationary in a selected position of rotatable adjustment thereof about the support structure, and to provide further for bodily raising and lowering the implement and the support link assembly with the support arm responsive to rotation of the shaft upon the spindle; a lower link assembly having a pivotal connection at one end to the hanger and adapted for pivotal connection to the implement at a location spaced from the pivotal connection of the implement to the support link assembly, said lower link assembly being axially adjustable within its pivotal connection to the hanger to provide for tiltable adjustment of the implement about the axis of the pivotal connection of the implement to the support link assembly; and resilient, yielding means connected to the support arm in position to exert a continuous, yielding pressure in a downward direction against the implement tending to hold the support link assembly in engagement with the support arm, said resilient, yielding means including a rod pivotally connected to the support arm and extending downwardly from the support arm, a collar mounted upon the rod and adjustable to selected positions axially of the rod, a spring circumposed about the rod and bearing at one end against said collar, and an ear slidably receiving the rod and adapted for fixed connection to said implement, the spring bearing at its lower end against said ear.

References Cited in the file of this patent

UNITED STATES PATENTS

| | | |
|---|---|---|
| 2,239,332 | Mee | Apr. 22, 1941 |
| 2,569,389 | Seaholm | Sept. 25, 1951 |
| 2,756,657 | Toland et al. | July 31, 1956 |